United States Patent

Nichols

[15] 3,699,996
[45] Oct. 24, 1972

[54] VALVE APPARATUS INCLUDING SELF-INSTALLING MECHANISM

[72] Inventor: Charles M. Nichols, P.O. Box 3, Linden, Ala. 36748

[22] Filed: July 27, 1971

[21] Appl. No.: 166,498

[52] U.S. Cl. .................................................. 137/318
[51] Int. Cl. ........................ F16e 41/04, B23b 41/08
[58] Field of Search ........ 137/315, 317, 318; 29/413, 29/; 408/110

[56] References Cited

UNITED STATES PATENTS 3,347,261  10/1967  Yancey ...................... 137/315
3,385,314  5/1968  Thompson ................. 137/318

*Primary Examiner*—Martin P. Schwadron
*Assistant Examiner*—David R. Matthews
*Attorney*—Jones & Thomas

[57] ABSTRACT

Valve having provision to cut its own installation hole so that the valve can be installed in an existing pipe line without removing the pipe line from service. A cutting tool is provided at an end of the valve apparatus, and motors are provided which move the cutting tool both rotationally and axially to cut a valve installation hole in the pipe. Provision is made for sealing the valve seat after the hole has been cut and the valve seat positioned, and for removing the cutting tool if desired. Once the installation is completed, the axial edn rotational motive apparatus can be removed and replaced with conventional valve actuating apparatus.

10 Claims, 1 Drawing Figure

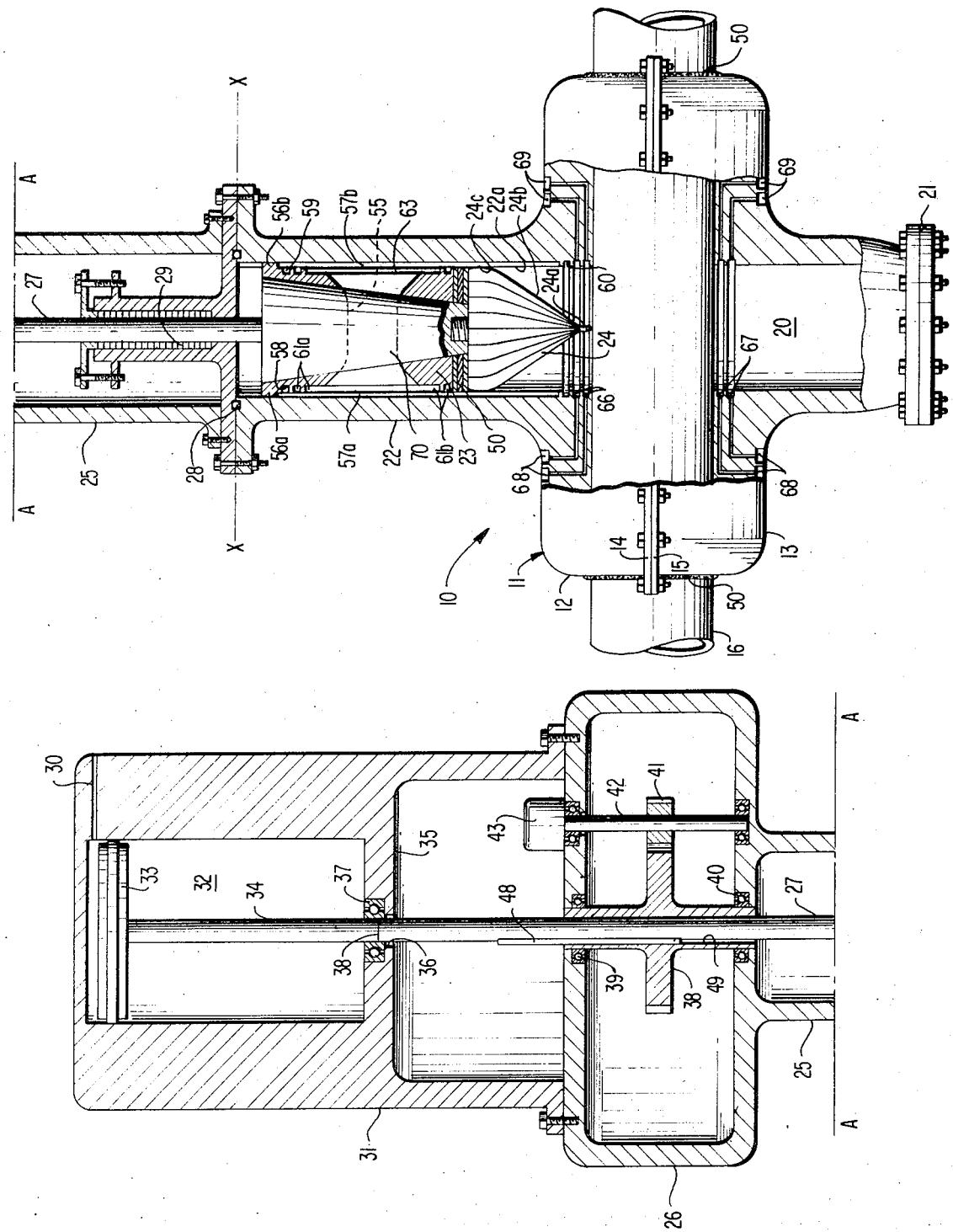

3,699,996

VALVE APPARATUS INCLUDING SELF-INSTALLING MECHANISM

This invention relates in general to valves and in particular to a valve which can be installed in a pipe without the need to remove the pipe from service.

A wide variety of valves are known in the prior art for installation in pipes and other fluid conduits for selectively controlling the fluid flow through the pipe. Installation of such prior art valves typically requires the pipe to be terminated at ends which have been specially prepared to accommodate the installation of a valve. Such preparations, for example, may include threading of the pipe ends or providing the pipe ends with valve-mating flanges or other devices known to those skilled in the art.

These prior art valve installation expedients require a substantial amount of labor and also frequently require specialized equipment for preparing the pipe ends. The problem of installing prior art valves is even greater, moreover, where the valve is to be installed in an existing pipe line, since the pipe line must be severed, a section of the pipe line removed to accommodate the insertion of the valve, and the remaining pipe ends prepared as appropriate to permit actual installation of the valve. Not only is a great deal of time and effort required to accomplish such installation, but it is obvious that the pipe must be removed from service for the time required to install the valve.

Accordingly, it is an object of the present invention to provide an improved valve.

It is another object of the present invention to provide a valve which is capable of rapid and simple installation in a pipe.

It is still another object of the present invention to provide a valve which is capable of being installed in a pipe without removing the pipe from service.

It is yet another object of the present invention to provide an improved valve capable of cutting its own installation opening in a pipe.

Other objects and many of the attendant advantages of the present invention will become more readily apparent from the attached specification and drawing.

THE FIGURE

The FIGURE shows a partially sectioned elevation view of a valve according to the present invention.

Stated generally, the valve of the present invention includes a housing which is sealed around a pipe and further includes a movable valve seat and valve member having a cutting tool which cuts an opening through the pipe sufficiently large to accommodate axial movement of the valve seat. The valve seat is then locked into position. The valve housing includes a closable aperture through which the cutting tool may be removed, if desired, once the valve has been installed.

More particularly and with reference taken to the depicted embodiment of the present invention, there is shown generally at 10 a valve apparatus including a valve housing 11 having an upper housing portion 12 and a lower housing portion 13 which are separately formed and which are shown to be joined together by means of bolted flanges 14 and 15 to define a passageway around a pipe 16. The lower housing portion 13 has an inner recess 20 to which access may be obtained by removal of the flanged end plate 21. The upper housing portion 12 is provided with a hollow upstanding extension 22 having a bore 22a which is coaxial with the recess 20 and within which is received the valve seat 23, the valve member 70, and the cutting tool 24 removably connected to the valve member at an end thereof.

An extension housing 25 connected along the line X—X to the upstanding extension portion 22 supports a gear housing 26 and also contains a hollow interior through which the valve stem 27 extends. An O-ring seal 28 and a suitable packing arrangement 29 prevent fluid from leaking from between the connection between the upstanding portion 22 and the extension housing 25, and also from leaking around the axially and rotationally movable valve stem 27.

A cylinder housing 31 is removably secured to the end of the gear housing which is opposite the extension housing 25. Contained within the cylinder housing 31 is a cylinder 32 containing a reciprocally movable piston 33 attached to the piston rod 34. A fluid passage 30 extends from the upper end of the cylinder 32 to the exterior of the cylinder housing 31.

The lower end of the cylinder 32 is defined by a wall member 35 having an aperture 36 therein. The piston rod 34 extends through the aperture and is slidably received therein by way of bearing apparatus 37, which permits both axial and rotational movement of the piston rod. The piston 34 and the separate valve stem 27 may be coupled together, or alternatively these two elements may be two separate members which are axially aligned and which merely abut each other, for example, as shown at 38.

Contained within the gear housing 26 is a sleeve gear 38 which is journaled in suitable bearings 39 and 40 and which meshes with a drive gear 41. The drive gear 41 is secured to a drive shaft 42 which is rotationally driven by a suitable motor 43, such as an air-powered motor or the like.

The valve stem 27 contains a spline 48 which extends outwardly from the stem and which is freely slidably received within a complementary spline slot 49 disposed within the interior passage of the sleeve gear 38. The relative diameters of the valve stem 27 and the interior passage of the sleeve gear 38 are chosen to permit free axial movement of the valve stem through the sleeve gear.

The valve seat 23 may have a generally cylindrical exterior to facilitate axial sliding movement along the bore 22a of the upstanding portion 22 and has a fluid passageway extending through the seat as shown in dashed lines on the FIGURE. The valve seat 23 is provided with a pair of key members 56a and 57b which slide in respective key ways 57a and 57b to prevent the valve seat from rotating as the piston moves downwardly, so that the proper alignment of the passageway 55 is maintained relative to the pipe 16.

An annular snap ring groove 58 having a snap ring 59 disposed therein under outwardly-expanding tension is disposed adjacent the upper end of the valve seat 23. A mating annular groove 60 is provided on the interior of the bore 22a to receive the snap ring 59 as described below. One or more annular sealant grooves 61a are provided at the upper end of the valve seat 23, and one or more horizontal sealant grooves 63 are provided extending along a portion of the length of the valve seat. It will become apparent that a single sealant-receiving annular region of reduced diameter may be provided around the periphery of the valve seat 23 in lieu of a number of discrete horizontal sealant grooves 63. One or more annular sealant grooves 61b are provided at the lower end of the valve seat.

One or more annular sealant grooves 66 are provided around the bore 22a of the upstanding portion 22 as shown, and one or more additional annular sealant grooves 67 are provided around the recess 20 in the lower housing portion of the valve. Sealant injection passages 68 and corresponding sealing vents 69 are provided in communication with opposite sides of the several sealant grooves 66,67.

The valve seat 23 contains a frusto-conical bore within which is received the valve member 70 of complementary frusto-conical configuration. The valve member 70 also has a fluid passageway therethrough, shown in lines at 55. Since the valve seat 23 is prevented by the key members 56a, 56b and the key ways 57a and 57b from rotating during the drilling process, the valve seat 23 and the valve member 70 preferably are made of materials which permit the required relative rotational movement without undue friction between 23 and 70. For example, the valve member 70 and the interior of the valve seat 23 may be machined from a metal such as brass and the bearing surfaces of these parts amply lubricated prior to initial assembly to provide the necessary bearing capability during the operation of boring through the pipe.

Lubrication can additionally be provided, if necessary, by one or more lubrication channels (not shown) on the surface of the valve member 70 facing the wall of the frusto-conical bore in the valve seat 23 and supplied with lubricant through a passage extending through the interior of the valve stem 27.

Considering now the operation of the disclosed embodiment, the upper and lower portions 12 and 13 of the valve housing are bolted together around a pipe 16 in which the valve is to be installed. A fluid-tight seal must be provided between the pipe and the valve and this seal can be accomplished, for example, either by girth welds 50 and/or internal seals positioned within the valve housing. Once the valve is suitably positioned and sealed on the pipe, air pressure is then applied to the drive motor 43 and through the passage 30 to the cylinder 32. The cutting tool 24 thus is rotated and is also forced downwardly against the exterior of the pipe.

The cutting tool 24 preferably includes a pilot drill portion 24a which drills a pilot hole for the main drill portion 24b. The cutting tool also may be provided with a finishing portion 24c which leaves a relatively smooth and burr-free surface where the cutting tool finally cuts through the pipe. A cleaning disk 50, which is mounted immediately behind the cutting tool 24, is also provided to accomplish a final smoothing and clean-up operation on the hole through the pipe and additionally to set suitable tolerance between the valve seat 23 and the valve member 70.

When the cutting tool 24 has completely cut through the pipe 16, the downward motion of the cutting tool, the valve seat 23, and the valve member 70 continues until the snap ring 59, which is contained in the snap ring groove 58, becomes aligned with the annular groove 60, at which time the snap ring 59 expands to occupy portions of both the annular groove 60 and the snap ring groove 58. The valve seat 23 thus becomes locked in place and is now incapable of upward or downward movement. The relative positions of the annular grooves 58 and 60 are chosen so that the fluid passage 55 through the valve seat is substantially aligned with the pipe 16 when valve seat locking occurs.

The procedure for installing the disclosed valve is completed by injecting a suitable sealant into the annular sealant grooves 61a, 66 and 67 (which are now aligned) and the horizontal sealant groove 63 by means of the several sealant passages 68. The sealant vents 69 are open during the sealant injection process to bleed the air from the sealant grooves and thus to insure than these grooves become completely filled with sealant material. In this manner a fluid-tight seal of the valve seat within the valve housing is provided. At this point, the cutting tool 24 may be removed from the valve by removing the end plate 21 and unscrewing the cutting tool from the end of the valve member 70. However, the cutting tool may be left in place without affecting the operation of the valve.

At this point, the cylinder housing 31 along with the piston 33, therein, may be removed and replaced by a conventional valve operating mechanism which selectively rotates valve member 70 in a manner well known in the art to place the passageway 55 into or out of alignment with the corresponding passageway in the valve seat 23.

The relative arrangement of locking snap ring and sealant grooves shown in the disclosed embodiment may be varied without detracting from the present invention. For example, a locking ring could be contained in a corresponding annular recess adjacent the sealant grooves 67 in the recess 20, and could be displaced into engagement with mating grooves on the lower or cutter-proximal end of the valve seat 23 by one or more set screws provided extending, for example, through bores in the wall leading into the recess 20.

It should be understood, of course, that the foregoing relates only to a preferred embodiment of the invention and that numerous modifications or alterations may be made therein without departing from the spirit and the scope of the invention as set forth in the appended claims.

What is claimed is:

1. Valve apparatus for installation on a pipe, comprising in combination:
    valve housing means defining a pipe passageway through which the pipe may be received;
    pipe cutting means received within said valve housing means in communication with said passageway and selectively operative to bore a valve receiving aperture in the pipe;
    valve seat means disposed within said valve housing means, said valve seat means including a fluid passage therethrough and being selectively operative to be moved through the aperture provided by said pipe cutting means to dispose said fluid passage into substantial alignment with the pipe; and valve member means disposed within said valve housing means and selectively operative to be disposed within said valve seat means in fluid flow blocking relation with said fluid passage therethrough, whereby to obstruct the flow of fluid through the pipe, and to be disposed in said fluid passage, whereby to permit fluid flow through the pipe.

2. Valve apparatus as in claim 1, wherein:
said valve housing means includes a valve passageway disposed in communication with said pipe passageway;
said pipe cutting means being received within said valve passageway and being selectively movable to extend from the valve passageway into cutting engagement with the pipe, and further comprising:
first motive means for urging said pipe cutting means into engagement with the pipe.

3. Apparatus as in claim 2, wherein said pipe cutting means comprising rotary cutting means received within said valve passageway to be axially moved into cutting engagement with the pipe, and further comprising second motive means operatively connected to said rotary cutting means for imparting pipe cutting rotation thereto.

4. Apparatus as in claim 1, further comprising:
a valve passageway disposed within said valve housing means to intersect said pipe passageway;
said valve seat means being movably received within said valve passageway to be selectively displaceable from a first position in which said valve seat means is completely withdrawn from said pipe opening to a second position in which said valve seat means is disposed in said pipe opening; and
means for retaining said valve seat means in said second position.

5. Apparatus as in claim 4, further comprising:
said valve seat means having a valve member recess extending therethrough in intersecting relationship with said fluid passage of said valve seat means;
said valve member means being configured to be receivable within said valve member recess;
said pipe cutting means being attached to the end of said valve member means which is proximal to said pipe passageway; and,
first motive means for axially displacing said valve means, said valve seat means, and said pipe cutting means along said valve passageway toward said pipe passageway.

6. Apparatus as in claim 5, wherein:
said valve member means is rotatably received within said valve member recess of said valve seat means, and further comprising:
second motive means operatively connected to said valve member means to selectively impart rotational motion thereto;
rotation restraining means operatively interrelated between said valve seat means and said valve passageway to prevent rotation of said valve seat means while permitting axial movement of said valve seat means along said valve passageway responsive to the operation of said first motive means.

7. Apparatus as in claim 6, wherein:
said retaining means includes a first recess disposed on the exterior of said valve seat means;
locking means disposed within said first recess to be urged outwardly therefrom; and
a second recess means disposed within said valve passageway to be in alignment with said first recess means and said locking means disposed therein when said valve seat has been displaced to said second position, whereby said locking means engages said second recess means to cause said valve seat means to be retained in said second position.

8. Apparatus as in claim 6 wherein at least said first motive means is detachably operatively engaged to impart displacement motion to said valve member means so that a valve member actuation means may be operatively associated with said valve member means after said valve seat means has become retained in position.

9. Apparatus as in claim 6 wherein said pipe cutting means includes a first rotary cutting portion for producing in the pipe a pilot hole which is substantially smaller than the pipe aperture required to accommodate entry of said valve seat means, said pipe cutting means further comprising a hold enlargement portion to be received within the pilot hole and to enlarge the pilot hole to the extent necessary to accommodate entry of said valve seat means.

10. Apparatus as in claim 6, further comprising at least one sealant receiving receptacle disposed on the exterior of said valve seat, and at least one corresponding sealant applying means associated with said valve housing means in position to establish sealant applying relationship with said sealant recess means when said valve seat means is retained in the locked position.

* * * * *